United States Patent
Shalla et al.

(10) Patent No.: US 8,548,881 B1
(45) Date of Patent: Oct. 1, 2013

(54) CREDIT OPTIMIZATION TO MINIMIZE LATENCY

(75) Inventors: Zachary M. Shalla, Seattle, WA (US); Gautam S. Shanbhag, Issaquah, WA (US); Ullas Sankhla, Seattle, WA (US)

(73) Assignee: Amazon Technologies, Inc., Reno, NV (US)

(*) Notice: Subject to any disclaimer, the term of this patent is extended or adjusted under 35 U.S.C. 154(b) by 0 days.

(21) Appl. No.: 13/465,732

(22) Filed: May 7, 2012

(51) Int. Cl.
*G06Q 20/10* (2012.01)

(52) U.S. Cl.
USPC .................. 705/34; 705/30; 705/40; 705/14.1

(58) Field of Classification Search
USPC ................................................. 455/406–408
See application file for complete search history.

(56) References Cited

U.S. PATENT DOCUMENTS

| | | | |
|---|---|---|---|
| 5,852,812 A * | 12/1998 | Reeder | 705/39 |
| 6,704,402 B1 * | 3/2004 | Pacifico et al. | 379/114.02 |
| 2001/0037270 A1 * | 11/2001 | Melo et al. | 705/34 |
| 2003/0074313 A1 * | 4/2003 | McConnell et al. | 705/40 |
| 2004/0153404 A1 * | 8/2004 | Rischmueller et al. | 705/40 |
| 2010/0091964 A1 * | 4/2010 | Daidone et al. | 379/114.04 |

* cited by examiner

*Primary Examiner* — Ryan Zeender
*Assistant Examiner* — Kristie A Mahone
(74) *Attorney, Agent, or Firm* — Knobbe Martens Olson & Bear, LLP

(57) ABSTRACT

Embodiments of systems and methods are described for reducing latency during invoice generation involving credit distribution. In some implementations, references to invoice line items are sorted by supplemental charge rate and credits are applied to the invoice line items in decreasing supplemental charge rate order. An invoice is generated that includes the invoice line items and associated credits. The process of generating applying the credits is optimized to minimize latency and to provide the greatest financial benefit to the user.

26 Claims, 7 Drawing Sheets

Figure 3

| Line Item (Ref. #) | Description | Cost ($) |
|---|---|---|
| LI-1 | Package A | 1,000 |
| LI-2 | Package B | 10,000 |
| LI-3 | Package C | 500 |
| LI-4 | Package D | 800 |
| LI-5 | Package E | 5,000 |
| | | 17,300 |

| Line Item (Ref. #) | Cost ($) | Supplemental Charge Rate (%) |
|---|---|---|
| LI-1 | 1,000 | 5 |
| LI-2 | 10,000 | 2 |
| LI-3 | 500 | 20 |
| LI-4 | 800 | 10 |
| LI-5 | 5,000 | 8 |

| Line Item (Ref. #) | Cost ($) | Supplemental Charge Rate (%) |
|---|---|---|
| LI-3 | 500 | 20 |
| LI-4 | 800 | 10 |
| LI-5 | 5,000 | 8 |
| LI-1 | 1,000 | 5 |
| LI-2 | 10,000 | 2 |

| Line Item (Ref. #) | Cost ($) | Supplemental Charge Rate (%) | Credit Applied ($) | Credit Balance ($) |
|---|---|---|---|---|
| LI-3 | 500 | 20 | (500) | 2000 |
| LI-4 | 800 | 10 | (800) | 1200 |
| LI-5 | 5,000 | 8 | (1,200) | 0 |
| LI-1 | 1,000 | 5 | - | - |
| LI-2 | 10,000 | 2 | - | - |

Figure 7

| Line Item (Ref. #) | Description | Cost ($) | Credit ($) | Sub. ($) | SCR (%) | Supp. Chg. ($) | LI Total ($) |
|---|---|---|---|---|---|---|---|
| LI-1 | Package A | 1,000 | 0 | 1,000 | 5 | 50 | 1,050 |
| LI-2 | Package B | 10,000 | 0 | 10,000 | 2 | 200 | 10,200 |
| LI-3 | Package C | 500 | (500) | 0 | 20 | 0 | 0 |
| LI-4 | Package D | 800 | (800) | 0 | 10 | 0 | 0 |
| LI-5 | Package E | 5,000 | (1,200) | 3,800 | 8 | 304 | 4,104 |
| | Invoice Total | 17,300 | (2,500) | | | 554 | 15,354 |

700

CREDIT OPTIMIZATION TO MINIMIZE LATENCY

BACKGROUND

Companies and organizations operate computer networks that interconnect numerous computing systems to support their operations. The computing systems can be located in a single geographical location (e.g., as part of a local network) or located in multiple distinct geographical locations (e.g., connected via one or more private or public intermediate networks). Data centers can house significant numbers of interconnected computing systems (e.g., private data centers operated by a single organization, and public data centers operated by third parties) to provide computing resources to customers. Public and private data centers can provide network access, power, hardware resources (e.g., computing and storage), and secure installation facilities for hardware owned by the data center, an organization, or by other customers.

To facilitate increased utilization of data center resources, virtualization technologies can allow a single physical computing machine to host one or more instances of virtual machines that appear and operate as independent computer machines to a connected computer user. With virtualization, the single physical computing device can create, maintain or delete virtual machines in a dynamic manner. In turn, users can request computer resources from a data center and be provided with varying numbers of virtual machine resources on an "as needed" basis or at least on an "as requested" basis.

Data centers provide various services associated with network-based computing, data storage, and data transfer. As the scale and scope of data centers has increased, the task of generating invoices to customers of these services has become increasingly complex, requiring extensive computational resources. In addition, invoice generation typically involves multiple iterations through all invoice line items and numerous network service calls to identify supplemental charges associated with each invoice line item. Network calls can increase latency, thereby draining data center resources and delaying invoice production.

BRIEF DESCRIPTION OF THE DRAWINGS

Throughout the drawings, reference numbers may be re-used to indicate correspondence between referenced elements. The drawings are provided to illustrate example embodiments described herein and are not intended to limit the scope of the disclosure.

FIG. 3 is an example of a line item data table that can be utilized by the invoice manager of FIG. 2;

FIG. 4 is an example of a line item reference data table that can be utilized by the invoice manager of FIG. 2;

FIG. 5 is an example of the line item reference data table of FIG. 4 sorted by supplemental charge rate;

FIG. 6 is an illustration of optimizing the application of credits, which can be implemented by the invoice manager of FIG. 2;

FIG. 7 is an example of an invoice generated by the invoice manager of FIG. 2;

DETAILED DESCRIPTION

Figure 1:
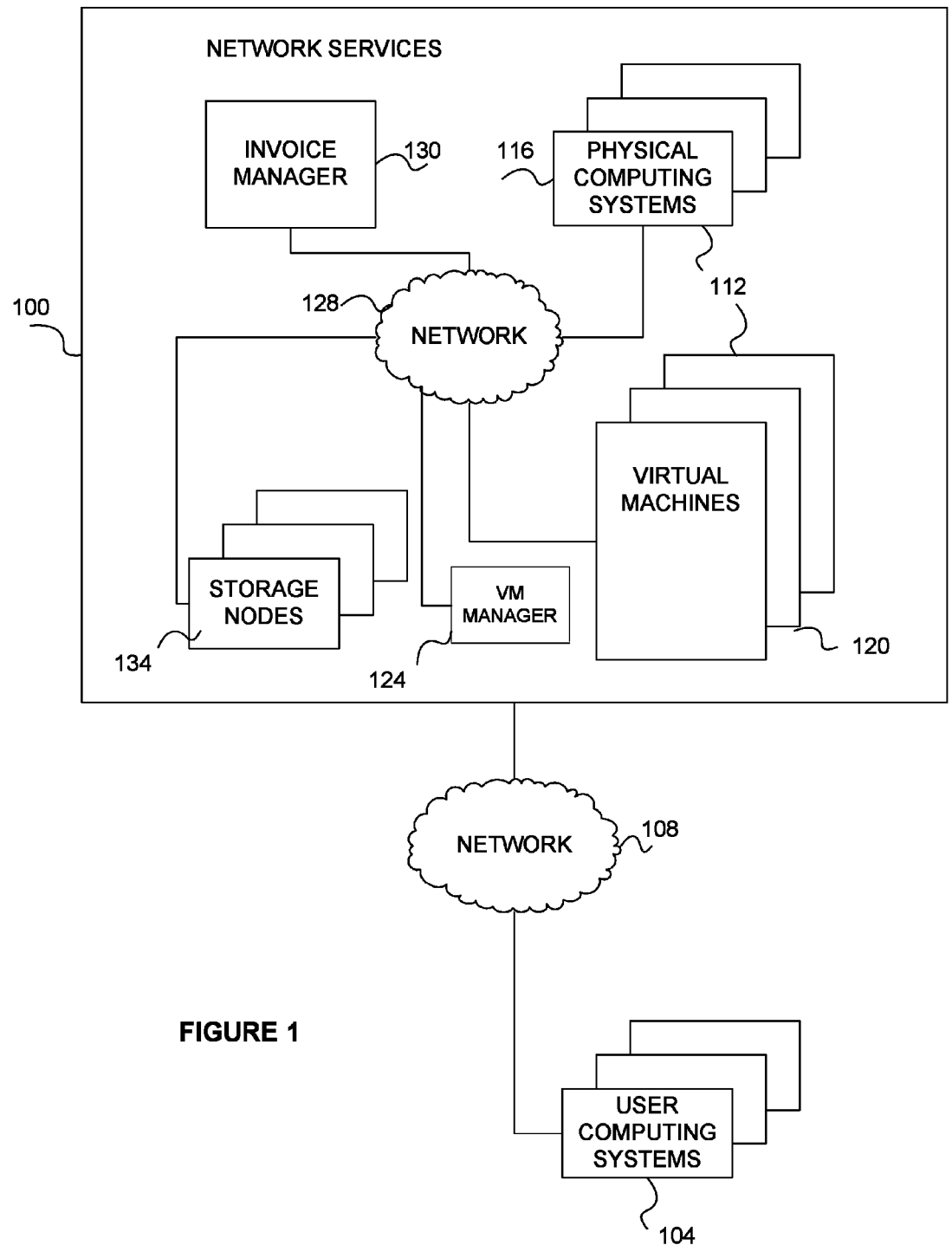
FIG. 1 is a network diagram schematically illustrating an example of a network service that can provide computing resources to multiple user computing systems via a communication network.

Embodiments of systems and methods are described for credit optimization by a data center that provides computing resources. Illustratively, the computing resources can include program execution capabilities, data storage or management capabilities, network bandwidth, computation, data transfer, etc. In some implementations, a user can request that a virtualization infrastructure be generated that can manage and reserve computer resources for the user during a future usage time period. For example, the user can request a virtualization infrastructure be generated that can manage and reserve data storage or network bandwidth for the user during the future usage period. The computing resource provider can determine which of the provider's computer resources can be made available to meet the user's request and can allocate those computer resources to the user during the requested usage period.

The virtualization infrastructure can be a run-time environment that includes an application software stack for the user's program together with one or more infrastructure services for executing the user's program on a program execution service or a web service. The virtualization infrastructure can include a user-selectable operating system (e.g., Linux, Windows, etc.), application server (e.g., Apache Tomcat), system or application configuration, etc. The virtualization infrastructure can be configured to be hosted at a specific URL. The infrastructure services can include, but are not limited to, a load balancer to distribute workload across the requested computing resources, a load scaler to scale computing resources in response to load or demand variations, a firewall or other service to control access to the computing resources, a monitoring interface that permits the user to monitor execution of the program, data storage resources (e.g., scalable volume block storage), and so forth. In some embodiments, the user may be able to select one or more programs or services that can be included in the virtualization infrastructure. For example, the user may be able to select from a plurality of database models (e.g., a relational database, SQL database, Oracle database, etc.). In some embodiments, the infrastructure services can be customized to the user rather than being a shared resource among a plurality of users. For example, in some such embodiments, the load balancer can be individually customized to the user's application rather than being shared or distributed among a number of users of a program execution or other network service.

Users may purchase one or more services from a data center. Pricing and costs are typically determined by a wide variety of parameters in order to provide maximum flexibility and scalability. For example, users can pay for only the particular quantity of resources actually utilized. In addition, pricing may vary depending upon whether minimum commitments exist, whether usage reaches tiered levels (e.g., pay less per unit as the as more units are utilized), duration of resource usage, time period of resource usage, whether resources have been reserved in advance, etc.

Invoices reflecting charges for such services can include thousands, if not hundreds of thousands of invoice line items for a particular billing period. In addition, each invoice line contains numerous data regarding particular combinations of purchased services and pricing parameters. In some cases, supplemental charges are associated with certain invoice line items. The term "supplemental charges" is a broad term intended to have its ordinary meaning. In addition, supplemental charges can also refer to costs that have a direct relationship to and are calculated based upon a particular line item's cost.

For example, in some situations, a customer may have entered into a "Premium Support Agreement" or other relationship with a data center, whereby the customer receives technical support (or other services) in exchange for payment of a supplemental charge. The supplemental charge can be calculated as a percentage (or rate) of the costs of the services utilized by the customer during a particular period of time. The supplemental charge rate may vary based upon the utilized data center services, the pricing parameters, the customer, the billing account, etc.

Therefore, generating a data center service usage invoice can often demand extensive computational resources and involve multiple network service calls. For example, network service calls may be utilized to determine the supplemental charges for each invoice line item. Multiple network service calls can therefore result in increased latency, a drain on network resources, and reduced system performance.

Invoice generation is further complicated when credits are applied. The term "credit" is a broad term intended to have its ordinary meaning. In addition, a credit may include a coupon, discount, promotion code, etc., or combination thereof. Typical fair distribution invoice crediting methods distribute credits among invoice line items according to relative line item weights. For example, under the fair distribution method, if an invoice includes only two items (a first item for $10 and a second item for $90), 10% of the credits will be allocated to the first item and 90% of the credit will be allocated to the second item. Such a method requires extensive resources (e.g., memory) when invoices include thousands, if not hundreds of thousands of line items, and can be further complicated when fair distribution results in line item credits of less than $0.01.

For example, under the fair distribution method, an invoice management system will typically iterate over all line items three separate times: a first time to retrieve all line item charges, a second time to distribute credits in a weighted manner, and a third time to calculate supplemental charges. In addition, applying credits according to a fair distribution method may not maximize the benefit received by the customer.

Variations in supplemental charge rates can affect the overall benefit received by the customer when applying credits to the customer's invoice. Customers will receive the maximum financial benefit when credits are preferentially applied to line items having higher supplemental charge rates. In addition, applying credits in such an optimized manner simplifies invoice generation, and reduces the number of times the process iterates through invoice line items.

Various aspects of the disclosure will now be described with regard to certain examples and embodiments, which are intended to illustrate but not to limit the disclosure.

FIG. 1 is a network diagram schematically illustrating an example of a network service 100 that can provide computing resources to multiple user computing systems 104 via a communication network 108. The network service 100 can be a web service or a collection of web services that can provide computing resources for rent to use for web and/or other application hosting. For example, the network service 100 can manage requests from a user to execute a program, or set of programs, on behalf of the user. At least some of the user computing systems 104 can be remote from the network service 100. In this example, users can use the computing systems 104 to access the network service 100 over the communication network 108. The network 108 can, for example, be a publicly accessible network of linked networks, such as the Internet, possibly operated by various distinct parties. In other embodiments, the network 108 can be a private network, such as, for example, a corporate or university network that is wholly or partially inaccessible to non-privileged users. In still other embodiments, the network 108 can include one or more private networks with access to and/or from the Internet. Moreover, the network 108 may be any wired network, wireless network, or combination thereof. In addition, the network 108 may be a personal area network, local area network, wide area network, cable network, satellite network, cellular telephone network, etc., or any combination thereof.

The network service 100 provides a variety of functionality for managing execution of programs for multiple users, for storing data, and/or for transferring data to and from user computing systems 104. In the example illustrated in FIG. 1, the network service 100 includes a plurality of computing nodes 112 that can execute programs on behalf of the users. The computing nodes 112 can include one or more physical computing systems 116 and/or one or more virtual machines 120 that are hosted on one or more physical computing systems. For example, a host computing system can provide multiple virtual machines 120 and include a virtual machine ("VM") manager 124 to manage those virtual machines (e.g., a hypervisor or other virtual machine monitor). In some embodiments, the VM manager 124 is provided by a different host computing system (e.g., physical computing system 116, server) than the host computing machine that provides the virtual machines 120.

In the example illustrated in FIG. 1, each of the computing nodes 112 has some amount of computing resources available for executing one or more programs. Each computing node 112 can provide a specific amount of program execution capacity, which can be measured, for example, by a combination of one or more of processing capacity (e.g., number and/or size of processing units), memory capacity, storage capacity, network bandwidth capacity, non-network communication bandwidth, etc. In some embodiments, the network service 100 can provide preconfigured computing nodes 112, with each preconfigured computing node having similar and/or equivalent amounts of resources available for executing programs on behalf of users. In other embodiments, the network service 100 can provide a selection of various different computing nodes 112 from which a user can choose for executing programs on behalf of the user. In yet other embodiments, the network service 100 can generate various computing nodes that are specific to a user and execution of the user's program. In some such embodiments, the computing nodes 112 can have varying amounts and/or types of computing resources (e.g., size, speed and/or type of processing units; number of processing units; amount of memory and/or storage; platform configuration, such as 32-bit or 64-bit, operating system, etc.).

The network service 100 can provide user computing systems 104 with access to storage nodes 134 that provide mass storage of data, programs, and other user information. The storage nodes 134 can include any type of persistent data storage, for example non-volatile memory devices such as, e.g., hard disk drives, optical disk drives, etc. In the example illustrated in FIG. 1, the computing nodes 112 can access the storage nodes 134 via a network 128. The network 128 can include multiple networking devices (not shown) such as, e.g., switches, edge routers, core routers, etc. The network 128 can, but need not be, a different network than the network 108 shown in FIG. 1.

An invoice manager 130 implemented by the network service 100 can generate and provide invoices to users or applications of the network service 100. For instance, the invoice manager 130 can automatically retrieve network service resource usage information relating to a particular time period, generate invoice line items based upon the automatically retrieved information, determine supplemental charge rates, apply credits in a manner that reduces network latency and computational resource requirements, and generate a final invoice, as described in greater detail, below.

In some embodiments, the invoice manager 130 is executed or embodied by one or more physical or virtual computing systems. For example, in some embodiments, one or more server computing systems that have components including a CPU, I/O components, storage, and memory can be used to execute the invoice manager 130. The I/O components can include a display, a network connection to the network 128, a computer-readable media drive, and other I/O devices (e.g., a keyboard, a mouse, speakers, etc.). An embodiment of the invoice manager 130 can be stored as one or more executable program modules (e.g., instruction sets, lines of code, etc.) in the memory of a server or servers. The invoice manager 130 can interact with computing nodes 112 (e.g., physical computing systems 116 and/or VMs 120) over the network 128. The invoice manager 130 can receive requests from users via the network 108 to generate an invoice. The term "module" is a broad term intended to have its broadest, ordinary meaning. In addition, the term "module" can refer to a set of computer-processor-executable instructions (e.g., an instruction set) that may be grouped together as a distinct unit or distributed within a memory (e.g., integrated with computer instructions for arguably non-optimized-credit-distribution processes) of a single computing device, or within the memories of multiple computing devices.

Figure 2:
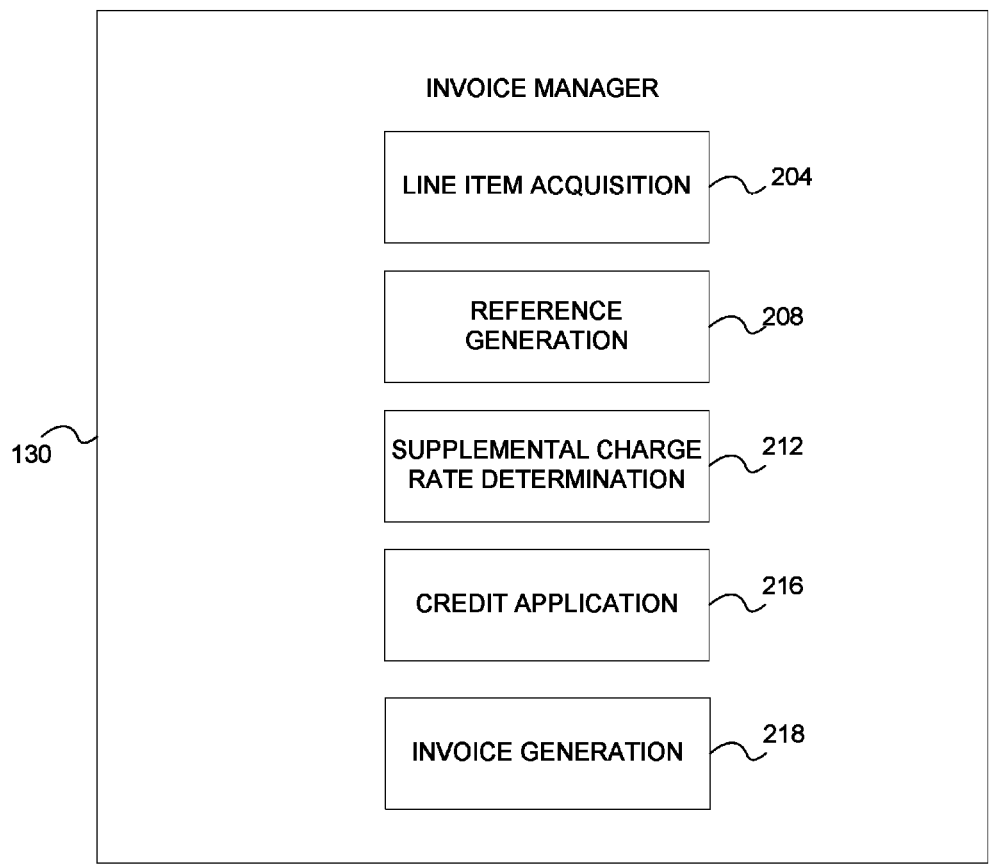
FIG. 2 is a block diagram schematically depicting illustrative components of an invoice manager of FIG. 1, configured to optimize the distribution of credits while generating an invoice in a manner that reduces network latency.

FIG. 2 is a block diagram schematically depicting illustrative components of an embodiment of the invoice manager 130. In this embodiment, the invoice manager 130 includes a line item acquisition module 204, a reference generation module 208, a supplemental charge rate determination module 212, a credit application module 216, and an invoice generation module 218.

The line item acquisition module 204 acquires invoice line item information from a resource usage data store based upon predetermined or customized invoice requirements. The resource usage data store is typically maintained and updated by the data center. The resource usage data store can reside in one or more continuous or discontinuous portions of one or more physical memory locations. For example, the resource usage data store can reside in multiple memory locations within several memory devices, or may reside within one or more partitions of a single (or multiple) memory device(s). The resource usage data store can include information regarding the resources (e.g., computational resources, data storage, data transfer, etc.) purchased by the data center's customers. For example, the line item acquisition module 204 may be configured to retrieve data service usage information relating to a desired time period, user, billing center, customer, data services, etc. In some embodiments, the line item acquisition module 204 acquires only a sub-set of the relevant line item information at a time in order to reduce memory requirements. In such embodiments, the invoice manager 130 may perform the methods described below on data sub-sets, and it may re-allocate credits as subsequent sub-sets are processed. Credit re-allocation is described in further detail below with respect to FIG. 9. In addition, when consolidated billing is utilized, the line item acquisition module 204 acquires invoice line item information associated with multiple users (or accounts) that are linked to a common payor account. The invoice manager 130 may be configured to optimize credit application and distribution among linked, consolidated billing accounts, as well. Credit allocation among consolidated billing accounts is discussed in further detail below with respect to FIG. 8.

One example of data retrieved by the line item acquisition module 204 is illustrated in the data table 300 of FIG. 3. The illustrated data table 300 can be stored and/or maintained in one of the storage nodes 134 of FIG. 1. The data table 300 includes line item reference numbers (e.g., LI-1 through LI-5), descriptions of data services (e.g., Packages A through E), and costs (e.g., $500 to $10,000). The data service descriptions are indicated as various "Packages." However, such notation is merely shorthand for extensive data and descriptions typically associated with each line item. For example, descriptions may include one or more of the type of service used, the duration of usage, the date of usage, the time of usage, the quantity of usage, user identification, billing center, etc. Each line item in the data table 300 can include several bytes of data. In some embodiments, each line item includes about 10 kB (10 kilobytes), about 50 kB, about 100 kB, about 500 kB, about 1 MB (megabyte), or more than about 1 MB of data, although other sizes are sometimes utilized.

The reference generation module 208 generates a reference list, data table, or database of select line item information acquired by the line item acquisition module 204. By storing only select line item information, the reference generation module 208 is able to reduce memory storage requirements of the invoice manager. For example, in one embodiment, the reference generation module 208 creates a table of line item references and associated costs, as illustrated in the first two columns of the data table 400 of FIG. 4. The data table 400 may be stored and/or maintained in one of the storage nodes 134 of FIG. 1. In one embodiment, each row of data in the data table 400 includes less data than a corresponding line item row in the data table 300 of FIG. 3. For example, each row of data in the data table 400 can include about 10 B (bytes), about 50 B, about 100 B, about 500 B, or about 1 kB of data, although other sizes are sometimes utilized. In some embodiments, each row of data in the data table 400 includes more than about 1 kB of data. In some embodiments, the size of the data table 400 row is determined as a percentage of a size of the line item from data table 300. For example, the size of each row in data table 400 can be about 0.01%, about 0.05%, about 0.1%, or about 1% of the size of a line item from data table 300, although other percentages are sometimes utilized.

The supplemental charge rate determination module 212 determines a supplemental charge for each line item in the reference generation module 208 table. As discussed above, a supplemental charge can refer to a cost incurred by a customer in exchange for various services (e.g., technical support, maintenance agreements, etc.), where the supplemental charge is calculated as a percentage (or rate) of the costs of the services utilized by the customer during a particular period of time. For example, the data center may agree to provide unlimited technical support to a customer in exchange for a 5% supplemental charge rate that is to be applied to particular services. Therefore, if the customer purchases $1,000 of the particular services, the customer will be charged an additional supplemental charge of $50. The customer's invoice can indicate the particular services purchased, the purchase price ($1,000) and the supplemental charge ($50) as a single line item. The supplemental charge rate may vary based upon the utilized data center services, the pricing parameters, the customer, the billing account, etc.

In one embodiment, the supplemental charge rate determination module 212 determines whether each line item from the reference generation module 208 is subject to a supplemental charge. If so, the supplemental charge rate determination module 212 determines the supplemental charge rate (or percentage) associated with such line item. One embodiment of a data table 400 including information generated by the reference generation module 208 and information determined by the supplemental charge rate determination module 212 is illustrated in FIG. 4. The data table 400 may be stored and/or maintained in one of the storage nodes 134 of FIG. 1. The illustrated data table 400 includes line item reference numbers (e.g., LI-1 through LI-5) and their associated costs (e.g., $500 to $10,000) and supplemental charge rates (e.g., 2% to 20%).

After the supplemental charge rate determination module 212 determines the supplemental charge rate for each line item stored by the reference generation module 208, the credit application module 216 can apply credits in an optimized manner. For example, the credit application module 216 can first sort the data of the supplemental charge rate determination module 212 by supplemental charge rate, as illustrated in the data table 500 of FIG. 5. In some embodiments, the credit application module 216 sorts the data by a column of data, or field, of the data table 300 or data table 400. For example, the credit application module 216 may sort the data by the supplemental charge, or any other field, including any item included within the Description of the purchased services (e.g., user account number, payor account number, service type, service description, date, quantity, etc.). The data table 500 may be stored and/or maintained on one of the storage nodes 134 of FIG. 1.

The credit application module 216 may then apply credits to each line item, starting with the line item having the greatest supplemental charge rate, and continuing in descending, supplemental-charge-rate-order until all credits have been applied. For example, the data table 600 of FIG. 6 illustrates an example of an optimized distribution by the credit application module 216 of a hypothetical $2,500 credit. The data table 600 may be stored and/or maintained on one of the storage nodes 134 of FIG. 1. As illustrated in FIG. 6, line item LI-3 has the greatest supplemental charge rate (20%). Therefore, the credit application module 216 applies the largest credit possible to that line item. Since the total available credit ($2,500) is greater than the line item cost ($500), the credit application module 216 applies a credit that is equal to the line item cost. The remaining credit balance ($2,500−$500=$2,000) is applied to the line item having the next-highest supplemental charge rate (LI-4, having a supplemental charge rate of 10%). In one embodiment, the credit application module 216 repeats this process until all credits have been applied. The credit application module 216 may advantageously minimize the number of iterations through invoice line items by terminating its process once the available credits are all applied.

Once credits have been applied, the invoice generation module 218 generates an invoice that includes all the line items acquired by the line item acquisition module 204 and associated supplemental charges and credits. One embodiment of an invoice 700 generated by the invoice generation module 218 is illustrated in FIG. 7. The invoice 700 of FIG. 7 includes line item reference numbers (e.g., LI-1 through LI-5), line item descriptions (Packages A-E), costs for each line item, credits for each line item, a sub-total (cost−credit), supplemental charge rates (percentage), supplemental charges (supplemental charge rate×sub-total), and line item totals (LI Total=sub-total+supplemental charge). The invoice 700 also indicates the total line item costs (before and after supplemental charges) and credits.

The illustrated invoice 700 of FIG. 7 is provided merely to demonstrate a simple, sample invoice that may be generated by the invoice generation module 218. Typical invoices may contain thousands or hundreds of thousands of line item entries, and may be generated in seconds or less in order to meet customer requirements for near instant invoice generation. Those skilled in the art will recognize that the actual invoice generated by the invoice generation module 218 may include similar or different information than the information illustrated in the example embodiment of FIG. 7.

Figure 8:
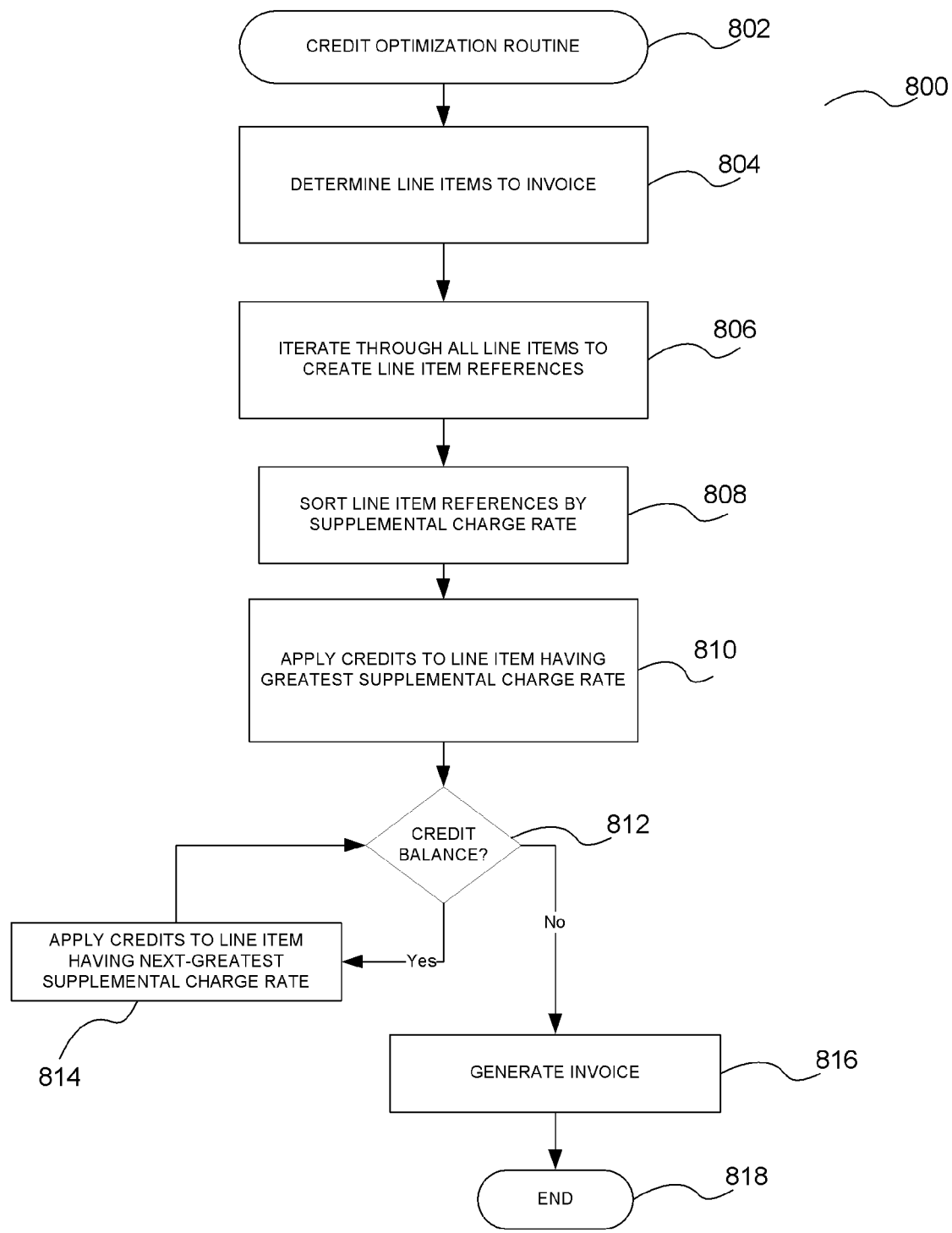
FIG. 8 is a flow diagram illustrating a credit optimization routine that may be implemented by the invoice manager of FIG. 2.

FIG. 8 is a flow diagram that schematically illustrates an example embodiment of a credit optimization routine 800. In some implementations, the routine 800 can be implemented by embodiments of the invoice manager 130 of the network service 100 described with reference to FIGS. 1 and 2. The example routine 800 is intended to illustrate, but not to limit, various aspects of the invoice manager 130.

With reference to FIG. 8, the credit optimization routine 800 begins at block 802. At block 804, the routine 800 determines line items to invoice. For example, a line item acquisition module, such as the line item acquisition module 204 described above with respect to FIG. 2 may determine line items to invoice. In some embodiments, the line items to invoice are all associated with a single user account. In other embodiments, when consolidated billing is utilized, the line items to invoice are associated with multiple user accounts that are linked to a common payor account. One example of a data table of such line items is illustrated as data table 300 of FIG. 3.

At block 806, the routine 800 iterates through the invoice line items to create a line item reference data table. For example, a reference generator, such as the reference generator 208 described above with respect to FIG. 2 may generate a line item reference data table, as illustrated in the first two columns of the data table 400 of FIG. 4. The line item reference data table can include line item reference numbers and associated costs. Supplemental charge rates may be determined at block 806 and stored in the line item reference data table, as well. One example of such a line item reference data table is illustrated as data table 400 of FIG. 4.

At block 808, the routine 800 sorts the line item reference data table by supplemental charge rate. For example, a credit application module, such as the credit application module 216 described above with respect to FIG. 2 may sort the line item reference data table by supplemental charge rate. One example of a line item reference data table sorted by supplemental charge rate is illustrated as data table 500 of FIG. 5.

At block 810, the routine 800 applies credits to the line item of the sorted line item reference data table that has the greatest supplemental charge rate. The routine 800 determines whether there is a credit balance after applying such credits. If a credit balance exists, the routine 800 continues to block 814; if not, the routine 800 continues to block 816. At block 814, the routine 800 applies credits to the line item having the next-greatest supplemental charge rate. The routine 800 then returns to block 812. One example, of the optimized credit application according to blocks 810, 812, and 814 is illustrated in FIG. 6.

At block 816, the routine 800 generates an invoice that includes the line items determined to invoice at block 804, associated descriptions and credits, as applied at block 810. One example of such an invoice is illustrated as invoice 700 of FIG. 7.

Figure 9:
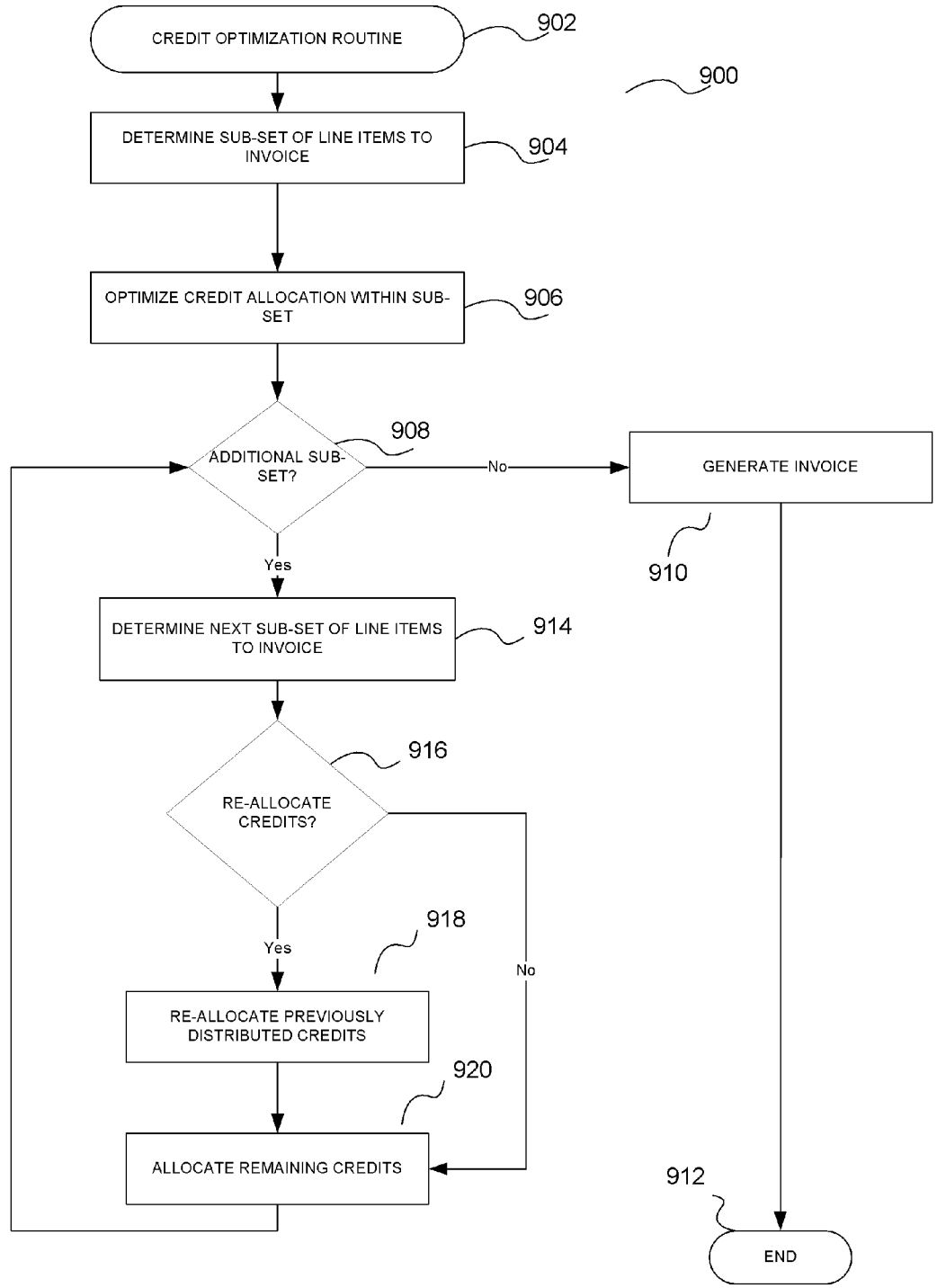
FIG. 9 is a flow diagram illustrating another credit optimization routine that may be implemented by the invoice manager of FIG. 2

FIG. 9 is a flow diagram that schematically illustrates another example embodiment of a credit optimization routine 900 that utilizes a memory pagination technique. In some implementations, the routine 900 can be implemented by embodiments of the invoice manager 130 of the network service 100 described with reference to FIGS. 1 and 2. The example routine 900 is intended to further illustrate, but not to limit, various aspects of the invoice manager 130. The routine 900 begins at block 902.

At block 904, the routine 900 determines a sub-set (e.g., a percentage, the first 100, 1,000, 10,000, or other predetermined number, etc.) of line items to process for invoicing. For example, at block 904 the routine 900 selects a sub-set of the line items determined by the routine 800 at block 804. In some embodiments, the routine 900 (or routine 800 at block 804) determines the sub-set size (e.g., the number of line items to retrieve at a time) based upon an amount of memory that has been allocated to the routine 900 by the invoice manager 130. For example, in some embodiments, each line item of information utilizes about 1 kB of memory, and there may be one million line items that are to be billed to a particular customer. Instead of retrieving all one million line items and holding all one million line items in memory for processing (which would utilize 1 million×1 kB=1 GB (gigabyte) of memory), the routine 900 performs optimized credit distribution in a piece-wise manner, as discussed herein For example, the invoice manager 130 may allocate 1 MB of memory (or any other predetermined amount) to each process that is implementing the routine 900 to process the 1 GB of line item information. If so, at block 904, the routine 900 may retrieve only about 1 MB of line item data at a time. In some embodiments, multiple routines 900 are executed in parallel or near parallel to reduce the time to process large amounts of data.

At block 906, the routine 900 optimizes credit allocation within the sub-set of line items to invoice. In one embodiment, at block 906 the routine 900 optimizes credit allocation within the sub-set according to the method of blocks 806 through 814 of routine 800. For example, when performing the operations to generate a reference table, the routine 900 (or routine 800 at block 806) may retain in memory only a small amount or percentage of the retrieved sub-set data (e.g., line item reference number and costs, as generated by the reference generator 208). In one embodiment, the retained data from the sub-set data is only about 10 kB in size.

At block 908, the routine 900 determines whether there are additional sub-sets of line items to analyze for credit optimization. In one embodiment, the reference table keeps track of which of its entries have been processed for optimized credit distribution. For example, if all invoice line items have been analyzed, the routine 900 proceeds to block 910. At block 910, the routine 900 generates an invoice that includes at least some invoice line items from at least some invoice line item sub-sets. The routine 900 ends at block 912.

If at block 908 additional invoice line items have not yet been analyzed, the routine 900 proceeds to block 914. At block 914, the routine 900 determines the next sub-set of line items to invoice. The next sub-set of line items can be pulled from the same memory location or a different memory location, as discussed above. For example, the next sub-set of line items can be pulled from the next continuous portion of the data store memory, from a different memory partition, and/or from a different physical memory location. At block 916, the routine 900 determines whether to re-allocate previously-distributed credits. For example, if a supplemental charge rate of the current sub-set is greater than a supplemental charge rate of a previous sub-set (for which a credit was applied), the routine 900 will determine that credit re-allocation should be performed in order to maximize the benefit provided to the customer. In such case, the process 900 proceeds to block 918. Otherwise, the routine 900 proceeds to block 920. At block 918, the process 900 re-allocates previously-distributed credits from line items in prior sub-sets to line items in the current sub-set that have higher supplemental charge rates. At block 920, the routine 900 allocates any remaining credits and returns to block 908. For example, in one embodiment the routine 900 allocates remaining credits according to the same process of block 906.

Advantageously, the routines 800 and 900 reduce network calls and latency by iterating through invoice line fewer times than would be required under a "fair distribution," or other scheme. Indeed, in some embodiments, the routines 800 and 900 iterate through, analyze and process invoice line items only one single time It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught or suggested herein without necessarily achieving other objects or advantages as my be taught or suggested herein.

Each of the processes, methods, and algorithms described in the preceding sections can be embodied in, and fully or partially automated by, code modules or instruction sets executed by one or more computers or computer processors. The code modules and instruction sets can be stored on any type of non-transitory computer-readable storage medium or computer storage device, such as hard drives, solid state memory, optical disc, and/or the like. The modules and instruction sets can also be transmitted as generated data signals (e.g., as part of a carrier wave or other analog or digital propagated signal) on a variety of computer-readable transmission mediums, including wireless-based and wired/cable-based mediums, and can take a variety of forms (e.g., as part of a single or multiplexed analog signal, or as multiple discrete digital packets or frames). The processes and algorithms can be implemented partially or wholly in application-specific circuitry. The results of the disclosed processes and process steps can be stored, persistently or otherwise, in any type of non-transitory computer storage such as, e.g., volatile or non-volatile storage.

The various features and processes described above can be used independently of one another, or can be combined in various ways. All possible combinations and subcombinations are intended to fall within the scope of this disclosure. In addition, certain method or process blocks can be omitted in some implementations. The methods and processes described herein are also not limited to any particular sequence, and the blocks or states relating thereto can be performed in other sequences that are appropriate. For example, described blocks or states can be performed in an order other than that specifically disclosed, or multiple blocks or states can be combined in a single block or state. The example blocks or states can be performed in serial, in parallel, or in some other manner. Blocks or states can be added to, or removed from the disclosed example embodiments. The example systems and components described herein can be configured differently than described. For example, elements can be added to, removed from, or rearranged compared to the disclosed example embodiments.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Conjunctive language such as the phrase "at least one of X, Y and Z," unless specifically stated otherwise, is understood with the context as used in general to convey that an item, term, etc. may be either X, Y or Z, or some combination thereof. Thus, such conjunctive language is not generally intended to imply that certain embodiments require at least one of X, at least one of Y and at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A non-transitory, computer-readable medium having computer-executable instruction sets configured to reduce latency during invoice generation involving credit distribution, the computer-executable instruction sets comprising:
    a line item acquisition instruction set configured to retrieve, from an electronic data store, invoice line item information associated with data service usage of at least one data services provider;
    a reference generation instruction set configured to generate an electronic reference table comprising a plurality of reference table entries, each entry associated with select portions of the invoice line item information acquired by the line item acquisition instruction set from the electronic data store;
    a supplemental charge rate determination instruction set configured to analyze at least a portion of each reference table entry to determine a supplemental charge rate associated with each reference table entry;
    a credit application instruction set configured to apply credits to select ones of the reference table entries in decreasing supplemental charge rate order, each credit being associated with particular retrieved invoice line item information; and
    an invoice generation instruction set configured to generate an invoice that includes at least some of the line item information acquired by the line item acquisition instruction set and the associated credits, as applied by the credit application instruction set.

2. The non-transitory, computer-readable medium of claim 1, wherein the line item acquisition instruction set is further configured to retrieve, from the electronic data store, invoice line item information from a plurality of accounts associated with a common payor.

3. The non-transitory, computer-readable medium of claim 1, wherein the line item acquisition instruction set is further configured to retrieve, from the electronic data store, invoice line item information based upon predetermined invoice requirements.

4. The non-transitory, computer-readable medium of claim 1, wherein the line item acquisition instruction set is configured to retrieve only a sub-set of the line item information prior to processing with the reference generation instruction set.

5. The non-transitory, computer readable medium of claim 4, further comprising a credit re-allocation instruction set configured to re-allocate credits from a portion of the sub-set of line item information.

6. The non-transitory, computer-readable medium of claim 1, wherein each entry of the reference table includes a line item reference and an associated line item cost.

7. The non-transitory, computer-readable medium of claim 1, wherein the credit application instruction set is further configured to sort the reference table entries by supplemental charge rate.

8. The non-transitory, computer-readable medium of claim 1, wherein the credit application instruction set is further configured to apply credits only when a credit balance exists.

9. The non-transitory, computer readable medium of claim 1, wherein the invoice generation instruction set is further configured to generate an invoice line item that includes a supplemental charge calculated based upon (i) the supplemental charge rate associated with a particular one of the reference table entries and (ii) the a line item cost less the credit applied to the line item particular reference table entry.

10. A computer-implemented method of reducing latency during invoice credit distribution, the computer implemented method comprising:
    as implemented by one or more computer systems comprising computer hardware and memory, the one or more computer systems configured with specific executable instructions:
    determining an allocated memory size usable to store data retrieved from an electronic data store;
    retrieving, from the electronic data store, invoice line item information associated with data service usage of at least one data services provider, the amount of invoice line item information retrieved being less than or equal to the allocated memory size;
    generating, by the one or more computer systems, an electronic reference table comprising a plurality of reference table entries, each entry associated with select portions of the retrieved invoice line item information;
    analyzing, by the one or more computer systems, at least a portion of each reference table entry to determine a supplemental charge rate associated with each reference table entry;

applying credits, by the one or more computer systems, to select ones of the reference table entries in decreasing supplemental charge rate order, each credit being associated with particular retrieved invoice line item information; and generating an invoice that includes at least some of the retrieved line item information and associated credits.

11. The computer-implemented method of claim 10, wherein the retrieving comprises retrieving invoice line item information from a plurality of accounts associated with a common payor.

12. The computer-implemented method of claim 10, wherein the retrieving invoice line item information is based upon predetermined invoice requirements.

13. The computer-implemented method of claim 10, wherein the retrieving invoice line item invoice information comprises retrieving only a sub-set of line item information prior to generating a reference table.

14. The computer-implemented method of claim 13, further comprising re-allocating credits from a portion of the sub-set of line item information.

15. The computer-implemented method of claim 10, wherein each reference table entry includes a line item reference and an associated line item cost.

16. The computer-implemented method of claim 10, wherein said applying credits further comprises sorting the electronic reference table entries by supplemental charge rate.

17. The computer-implemented method of claim 10, wherein said generating an invoice comprises generating an invoice that further includes supplemental charges associated with the retrieved line item information.

18. A system comprising:
   a data store that store invoice line item information associated with data service usage; and
   one or more processors in communication with the data store, the one or more processers configured to:
      retrieve, from the data store, invoice line item information associated with data service usage of at least one data services provider;
      generate an electronic reference table comprising a plurality of reference table entries, each entry associated with select portions of the retrieved invoice line item information;
      analyze at least a portion of each reference table entry to determine a supplemental charge rate associated with each reference table entry;
      apply credits to select ones of the reference table entries in decreasing supplemental charge rate order, each credit being associated with particular retrieved invoice line item information; and
      generate an invoice that includes at least some of the retrieved line item information and associated credits.

19. The system of claim 18, wherein the one or more processor are further configured to retrieve invoice line item information from a plurality of accounts associated with a common payor.

20. The system of claim 18, wherein the one or more processors are further configured to retrieve invoice line item information is based upon predetermined invoice requirements.

21. The system of claim 18, wherein the one or more processors are further configured to retrieve only a sub-set of line item information prior to causing a computing system to generate a reference table.

22. The system of claim 21, wherein the one or more processors are further configured to re-allocate credits from a portion of the sub-set of line item information.

23. The system of claim 18, wherein each reference table entry includes a line item reference and an associated line item cost.

24. The system of claim 18, wherein the one or more processors are further configured to sort the reference table entries by supplemental charge rate.

25. The system of claim 18, wherein the one or more processors are further configured to generate an invoice that further includes supplemental charges associated with the retrieved line item information.

26. The system of claim 18, wherein the one or more processors are configured to retrieve, from the data store, invoice line item information for at least one thousand line items.

* * * * *

UNITED STATES PATENT AND TRADEMARK OFFICE
CERTIFICATE OF CORRECTION

PATENT NO.        : 8,548,881 B1
APPLICATION NO.   : 13/465732
DATED             : October 1, 2013
INVENTOR(S)       : Shalla et al.

Page 1 of 1

It is certified that error appears in the above-identified patent and that said Letters Patent is hereby corrected as shown below:

In the Claims

In column 12 at line 25, in Claim 5, change "computer readable" to --computer-readable--.

In column 12 at line 39, in Claim 9, change "computer readable" to --computer-readable--.

In column 12 at line 44, in Claim 9, change "the a" to --the--.

In column 12 at line 45, in Claim 9, change "the line item" to --the--.

In column 12 at line 47, in Claim 10, change "credit" to --generation involving credit--.

Signed and Sealed this
Third Day of June, 2014

Michelle K. Lee
*Deputy Director of the United States Patent and Trademark Office*